US00RE44089E

(19) United States
(12) Reissued Patent
Ahmavaara

(10) Patent Number: US RE44,089 E
(45) Date of Reissued Patent: Mar. 19, 2013

(54) RADIO SYSTEM AND METHODS FOR DUPLEX OPERATION

(75) Inventor: Kalle Ahmavaara, San Diego, CA (US)

(73) Assignee: Motorola Mobility LLC, Libertyville, IL (US)

(21) Appl. No.: 12/657,964

(22) Filed: Jan. 29, 2010

Related U.S. Patent Documents

Reissue of:
(64) Patent No.: 6,747,966
Issued: Jun. 8, 2004
Appl. No.: 09/331,410
PCT Filed: Dec. 30, 1997
PCT No.: PCT/FI97/00833
§ 371 (c)(1),
(2), (4) Date: Jul. 7, 1999
PCT Pub. No.: WO98/32236
PCT Pub. Date: Jul. 23, 1998

(30) Foreign Application Priority Data

Dec. 31, 1996 (FI) ..... 965299

(51) Int. Cl.
*H04J 3/00* (2006.01)
*H04B 7/212* (2006.01)
*G08C 25/02* (2006.01)

(52) U.S. Cl. ..... 370/328; 370/337; 370/347; 370/441; 714/748

(58) Field of Classification Search ..... None
See application file for complete search history.

(56) References Cited

U.S. PATENT DOCUMENTS

| | | | | |
|---|---|---|---|---|
| 5,117,423 A | | 5/1992 | Shepherd et al. | 370/280 |
| 5,193,091 A | | 3/1993 | Crisler et al. | 370/336 |
| 5,267,233 A | | 11/1993 | Bauerschmidt | 370/343 |
| 5,450,618 A | | 9/1995 | Naddell et al. | 370/296 |
| 5,515,364 A | | 5/1996 | Fague | 370/278 |
| 5,680,398 A | | 10/1997 | Robinson | 370/276 |
| 5,689,502 A | | 11/1997 | Scott | 370/281 |
| 5,729,541 A | * | 3/1998 | Hamalainen et al. | 370/337 |
| 5,734,969 A | | 3/1998 | Shiraishi et al. | 370/294 |
| 5,802,046 A | | 9/1998 | Scott | 370/280 |
| 5,828,695 A | | 10/1998 | Webb | 375/219 |
| 5,839,071 A | | 11/1998 | Johnson | 455/440 |
| 5,931,964 A | * | 8/1999 | Beming et al. | 714/748 |
| 6,028,853 A | | 2/2000 | Haartsen | 370/280 |
| 6,370,356 B2 | | 4/2002 | Duplessis et al. | 455/426 |
| 6,388,996 B1 | | 5/2002 | Biedermann et al. | 370/280 |

FOREIGN PATENT DOCUMENTS

| | | |
|---|---|---|
| EP | 0529859 A2 | 3/1993 |
| GB | 2 281 470 A | 3/1995 |

* cited by examiner

*Primary Examiner* — Melanie Jagannathan

(57) ABSTRACT

A method for duplex telecommunication connection in radio connections is based on a frame-structured interactive communication and a radio system where the frame-structured interactive communication is performed in the radio connections. A means is provided for improving the use of channel resources in implementation of interactive telecommunication connection by providing an FDD connection with one or more TDD dimensions. A full-duplex frequency band is time-duplexed into two or more sub-bands in which interactive communication takes place substantially independently. Transmissions in different transmission directions in each sub-band occur at different times, but simultaneous transmission can occur in different sub-bands in different transmission directions. The message is received entirely in one transmission direction before it needs to be responded to in another transmission direction in a particular sub-band. The frequency band is utilized effectively for communication because transmission can be performed simultaneously in different sub-bands in the reverse transmission directions.

13 Claims, 5 Drawing Sheets

RADIO SYSTEM AND METHODS FOR DUPLEX OPERATION

Figure 1:
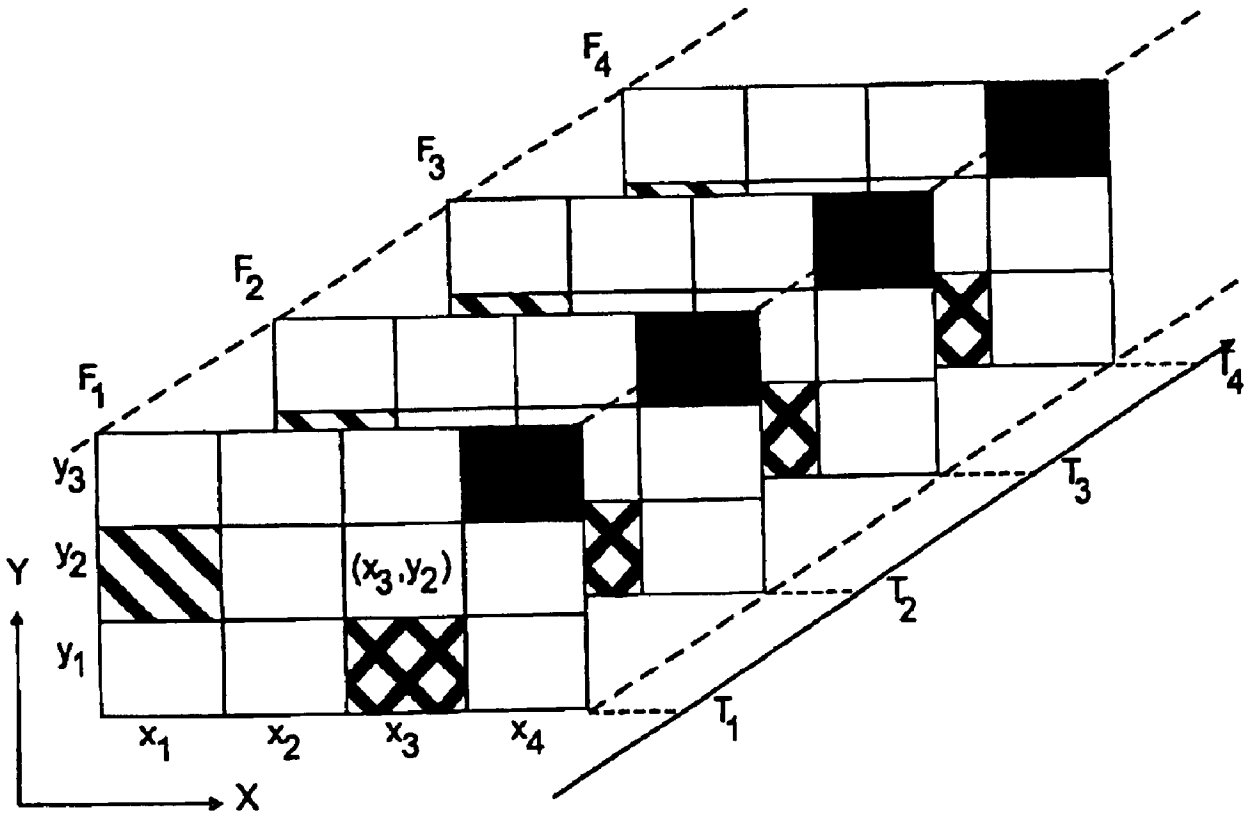
FIG. 1 (PRIOR ART)

Matter enclosed in heavy brackets [ ] appears in the original patent but forms no part of this reissue specification; matter printed in italics indicates the additions made by reissue.

*CROSS REFERENCE TO REISSUE APPLICATIONS*

*More than one reissue application has been filed for the reissue of U.S. Pat. No. 6,747,966. The reissue applications are application Ser. No. 11/446,603 (the parent reissue application, filed on Jun. 2, 2006 and issued as U.S. Pat. No. Re. 41,178) and Ser. No. 12/657,964 (the present divisional reissue application, filed on Jan. 29, 2010).*

FIELD OF THE INVENTION

The invention relates to radio systems and particularly to the effective processing of interactive traffic in a radio band.

BACKGROUND OF THE INVENTION

In future mobile systems, the proportion of a radio resource to be allocated to different subscribers varies considerably according to the required capacity and the standard of service. The new services offered together with normal speech transmission and the requirements relating to data transmission increase the need for allocating the radio resource more efficiently.

A frequency band reserved for a radio system is allocated to users as radio channels in accordance with the selected multiple access technique (Multiple Access). A radio channel is a frequency band employed in a radio connection or a portion of the frequency band separated for example by means of time or a user-specific code. In analogue systems, radio channels are usually frequency channels, whereby a dedicated frequency band is reserved for each radio connection, the frequency band being a part of the frequency resource in the system. This technique is called frequency division multiple access (FDMA). In time division multiple access (TDMA), a time slot is assigned for each radio connection from a common frequency band. Code division multiple access (CDMA) is a multiple access technique implemented by means of a spread spectrum technique wherein radio transmissions employing the same frequency band are coded in such a way that signals for a particular receiver party can be received only at particular receivers.

A radio system based telecommunication connection can be a simplex or a duplex connection. The simplex connection is a telecommunication connection wherein the user can only either transmit or receive information simultaneously. The duplex connection is a telecommunication connection wherein the user can transmit and receive information simultaneously. A semiduplex connection is a combination of the two aforementioned connections, i.e. a telecommunication connection wherein one party employs the simplex connection and the other party employs the duplex connection.

In radio traffic, the duplex connection is often implemented by employing different transmission and reception frequencies (frequency division duplex, FDD). The difference between the transmission frequency and the reception frequency is called a duplex spacing. Most digital mobile communication systems, such as the GSM (Global System for Mobile Communications) and DCS-1800 (Digital Cellular System for 188 MHz) are based upon time division multiple access (TDMA) implemented by a FDD telecommunication connection. New PCS (Personal Communication System) systems implemented in the U.S. will apply a new IS-95 system based upon code division multiple access (CDMA).

Another duplexing method is time division duplex (TDD) wherein the signals are transmitted time-interleaved on the same transmission channel. In systems employing frequency division multiple access (FDMA) implemented by a TDD telecommunication connection, for example in the CT2 (Cordless Telephone, 2nd generation), transmission alternates with reception in a frequency band reserved for one subscriber. In systems employing time division multiple access (TDMA) implemented by the TDD connection, such as the DECT (Digital European Cordless Telecommunications), transmission alternate with reception in a frequency-band time slot reserved for one subscriber.

In mobile communication systems, the connection between mobile stations and base stations is accomplished through a radio path. A channel from the mobile station to the base station is called an uplink transmission path and, correspondingly, a channel from the base station to the mobile station is called a downlink transmission path.

A radio connection is based on successive data frames, the data frames being constructed according to the selected multiple access technique of for example adjacent frequency bands and time periods. The part of the frame which can be unambiguously referred to by means of selected parameters (such as a frame frequency band, a time slot number or a code) is called a frame address. A radio channel is hereinafter taken to mean a data transmission implemented in adjacent frames in one or several determined frame addresses. The properties of the radio channel communication can be affected by allocating the frame addresses. By establishing a radio channel composed of several frame addresses, more data transmission capacity will be obtained for example for the data transmission.

An interactive data transmission is a duplex communication where messages in the uplink and downlink transmission paths interact with each other. An example is given here illustrating a channel allocation between the mobile station and the base station. The uplink transmission path is hereinafter referred to as the uplink and the downlink transmission path is referred to as the downlink. The base station informs about free addresses in a message transmitted on a Y channel (Yell) in the downlink direction. A mobile station desiring to establish a connection transmits a random access (RA) message in the uplink direction on a channel selected among the channels indicated to be free by the Y channel, the RA message including the desire to establish a connection. The desired standard of service, i.e. the amount of the resource the connection to be established requires, is also informed in the RA message. The RA message is responded by an access grant (AG) message in the downlink direction, the AG message informing the mobile station about the frame address or frame addresses to be employed in the radio channel to be established.

The above described message transmission is accomplished without problems when traffic intensity is low enough, the downlink messages having enough time to react with the previous uplink messages by means of the suitable selection of the frame addresses. The frame becomes full with the increase of traffic, whereby the messages relating to the interactive connection are located within the entire frame matrix and all the message addresses cannot then be selected in a suitable way. Consequently, the downlink messages cannot always be positioned in such frame addresses wherein the messages would have enough time to react with the messages submitted in the previous message in the uplink direction or, on the other hand, where there would be enough time to transmit information useful for all the subsequent frames in the uplink direction. The use of the channel resources in this way is ineffective and radio spectrum is wasted in the implementation of the interactive connection.

A similar problem is faced for example with the data transmission originating from the mobile station in connection with acknowledgement messages. A number of frame addresses is allocated to a subscriber for the data transmission. When the data transmission in the uplink direction is completed, the base station sends an acknowledgement message (for example automatic repeat request, ARQ) to the mobile station, the subscriber using the message for detecting whether the data transmission was successful. If the system disconnects the connection immediately after the data transmission and, after disconnecting the connection, receives a message of the data transmission failure, the connection must be re-established. If the system maintains the connection until the positive acknowledgement, an extensive channel allocation must be maintained unnecessarily in connection with the positive acknowledgement, i.e. capacity is wasted in the implementation of the interactive message transmission.

BRIEF DESCRIPTION OF THE INVENTION

The object of the present invention is to introduce a method which provides a simple way to avoid the above described problem relating to the use of the channel resource in the implementation of an interactive telecommunication connection.

This object is achieved by the method for the interactive communication in a full-duplex radio band comprising an uplink direction and a downlink direction. The method is characterized by time-duplexing the full-duplex radio band at least into a first sub-band and a second sub-band, communicating in said at least first sub-band and second sub-band simultaneously and yet independently in such a way that the uplink communication in the first sub-band occurs simultaneously with the downlink communication in some other sub-band and the downlink communication in the first sub-band occurs simultaneously with the uplink communication in some other sub-band.

The invention also relates to the methods according to claim 2, 3, or 4 and radio systems according to claims 7, 8 and 9.

The invention is based on the idea that the FDD telecommunication connection is improved by providing the connection with two or more TDD dimensions. The general approach of the invention is that the full-duplex frequency band is time-duplexed into two or more sub-bands with a substantially independent interactive communication. Transmissions in different transmission directions in each sub-band occur at different times but a simultaneous transmission in two different sub-bands can occur in different transmission directions. It is an advantage of the invention in the interactive communication that the message is received entirely in one transmission direction before the response is required in a particular sub-band in another transmission direction. On the other hand, the frequency band is utilized for traffic effectively, since it is possible to transmit simultaneously in different sub-bands in reverse transmission directions.

In a preferred embodiment of the invention, one FDD frame, hereinafter referred to as a superframe, is composed of at least two subframes that are time-duplexed with respect to the corresponding subframes in the reverse transmission direction. Interactive connection messages are formed on the basis of the previous subframe message or subframe messages in the reverse transmission direction.

It is an advantage of the invention that the information needed by the interactive message and transmitted through each subframe can be utilized as a whole during said subframe. The system has then enough time to react with the information transmitted in the previous subframe. This effect can be improved in some systems by locating the messages wisely in the frame. Interactive signalling becomes faster and the utilization of the frequency spectrum becomes substantially more effective compared with prior art solutions.

For example the allocation of free channels in the downlink direction in association with the channel allocation is based upon the information within the entire previous uplink frame. The frame addresses detected to be free on the basis of the previous uplink subframe are informed in the downlink subframe by means of virtual time-duplexing according to the invention. The system has then enough time to take into account all the random access messages from the previous uplink subframe and to inform about the free channels on the basis of this information in the next corresponding downlink subframe. This allows the mobile stations to have the channel allocation information for use in the next subframe, i.e. they are given access to the channels considerably faster than before. In the prior art solution, a Y channel message in the downlink direction cannot respond to all the uplink frame messages, whereby the corresponding allocation message can be delayed by at least one frame.

The time-dependent separation of messages transmitted in different transmission directions provides many benefits which are dealt with in more detail in connection with the detailed description of the embodiments of the invention. It is obvious, however, that the invention provides a substantial improvement in the implementation of the radio connection through the data frames.

LIST OF FIGURES

Figure 2:
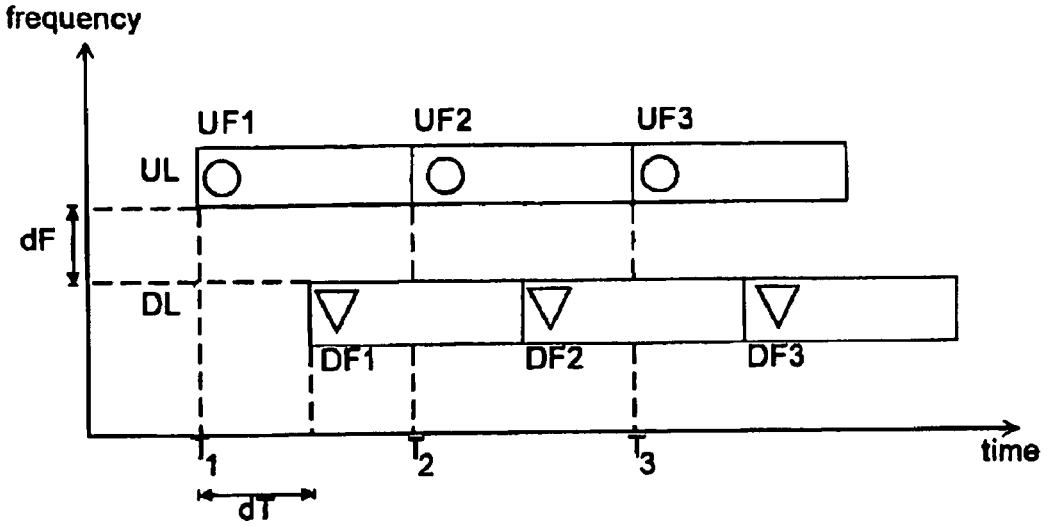
FIG. 2 (PRIOR ART)
Figure 3:
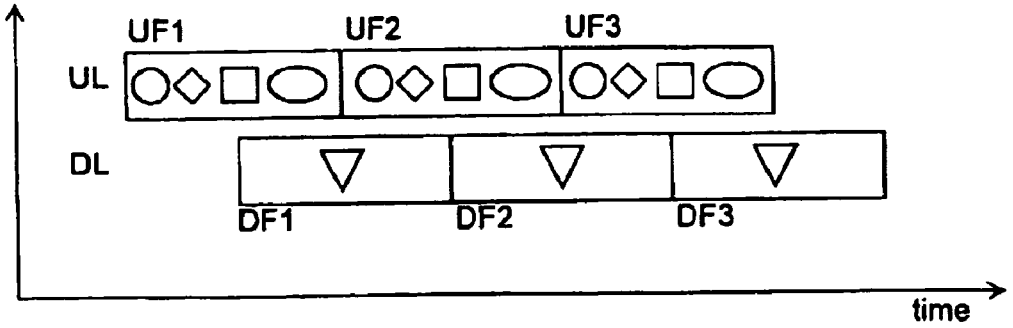
FIG. 3 (PRIOR ART)
Figure 4:
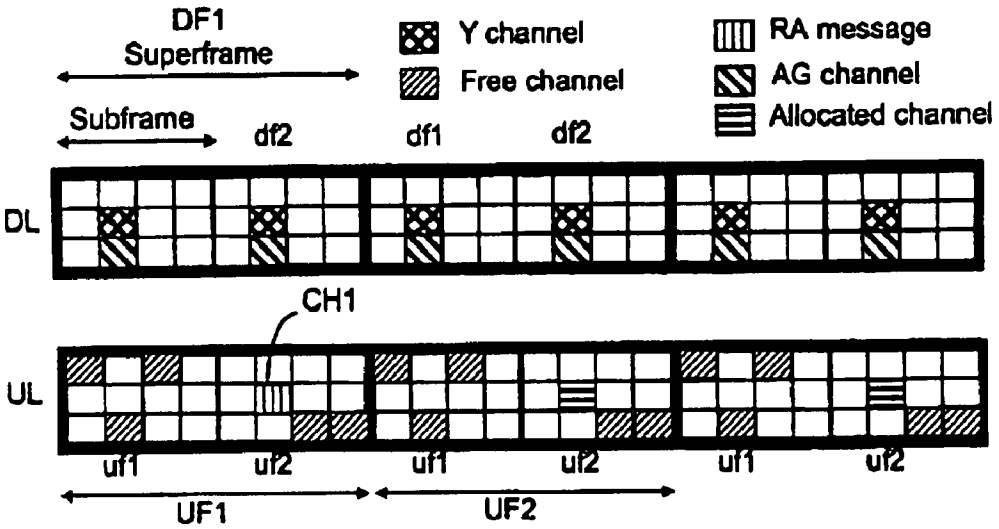
Figure 5:
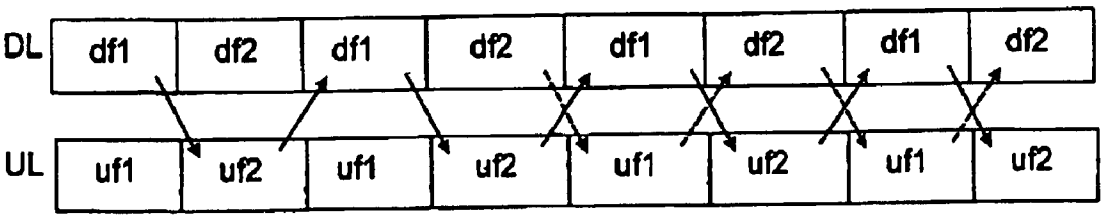
Figure 6:
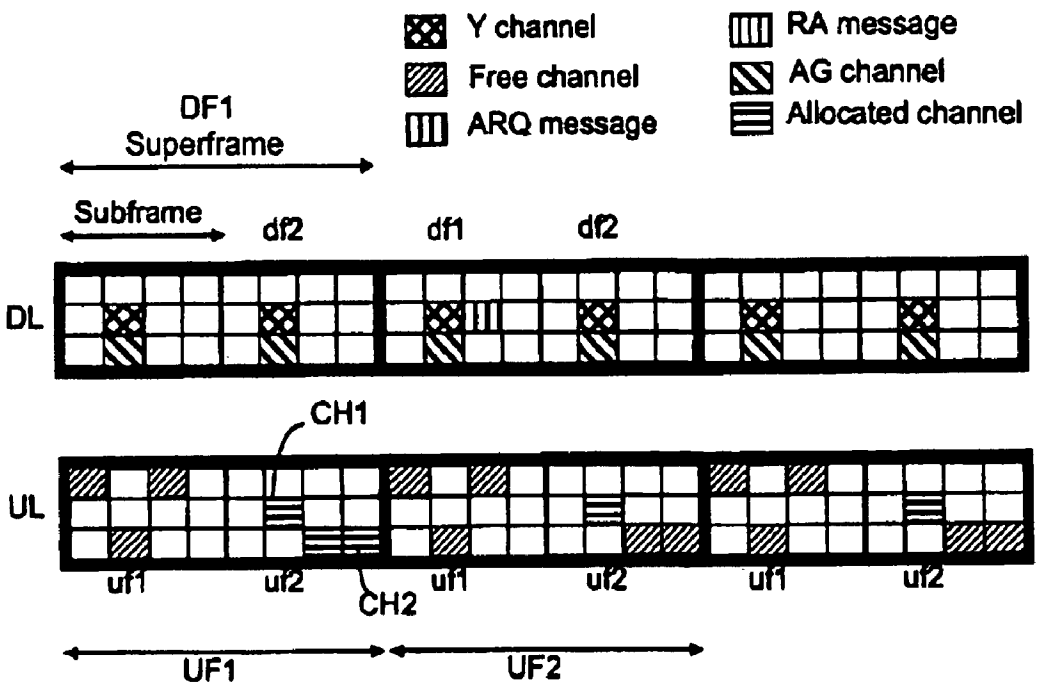
Figure 7:
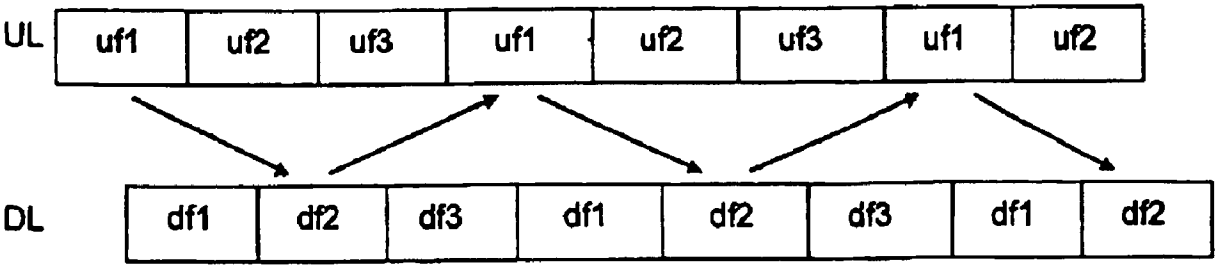

The invention will be described in more detail with reference to the accompanying figures, in which FIG. 1 illustrates a frame structure and channels of a radio interface, FIGS. 2 and 3 illustrate uplink and downlink radio bands, their frame division and two different interactive traffic situations, FIG. 4 shows a frame structure in uplink and downlink bands according to the primary embodiment of the invention, FIG. 5 illustrates interactive communication in association with a frame structure as shown in FIG. 4, FIG. 6 illustrates a data transmission acknowledgement in association with a frame structure as shown in FIG. 4, and FIG. 7 illustrates interactive communication in the case where the superframe of the invention is composed of three subframes, *and*

Figure 8:
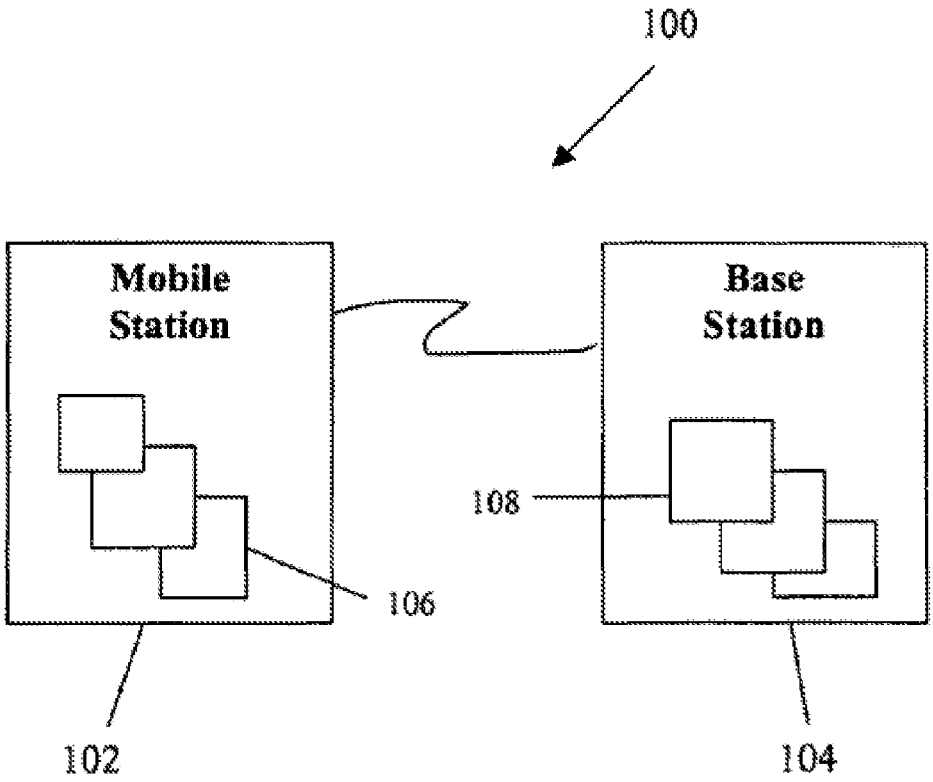

*FIG. 8 is a diagram illustrating a radio system comprising a base station and a mobile station.*

DETAILED DESCRIPTION OF THE INVENTION

In the following, the invention is described in more detail in association with TDMA multiple access technique, the invention, however, not being restricted to this technique. The application of the invention within the scope of the specification and claims of the invention in other multiple access techniques, such as CDMA, is obvious to those skilled in the art. The concepts channel and frame are then applied according to the principles of the multiple access technique to be used.

FIG. 1 illustrates a radio interface based on data frames and traffic channel allocation in a frame system. In TDMA multiple access technique, a y-direction drawn in FIG. 1 shows frequency differentiation, i.e. each overlapping y level (y1, y2, y3) illustrates one frequency segment. Correspondingly, an x-direction drawn in FIG. 1 shows time differentiation, i.e. each adjacent x level (x1, x2, x3, x4) illustrates one time slot. A radio channel can be unambiguously identified by an address (for example x3, y2) addressing one rectangle in a frame shown in FIG. 1. A channel is composed of information transmitted in a determined frame address of one frame or successive frames (F1, F2, F3, F4).

The frame in FIG. 1 shows a data frame associated with a substantially one transmission direction. A reverse transmission direction is composed of a structurally identical frame in another frequency segment. FIG. 2 illustrates channel arrangement for one frequency band, (one layer in the y-direction in FIG. 1) in the uplink and downlink directions (UL and DL respectively). A duplex frequency spacing (dF) exists between the UL band separated from the uplink frame and the DL band separated from the downlink frame and, in prior art solutions, the downlink frames have been delayed by some time slots (dT) compared with the uplink frames. For example in the GSM system, the duplex spacing is 45 MHz and the numbering of downlink frame time slots is delayed by three time slots compared with the uplink frames.

An interactive radio connection is a duplex data transmission where a message submitted in one transmission direction affects the corresponding message transmitted in the reverse transmission direction. Signalling of a mobile station and a base station during the channel allocation and different types of acknowledgement messages in the data transmission are given as examples of interactive connections.

In future mobile communication systems, the use of interactive connections will most likely dramatically increase. In the new systems, a channel is not reserved subscriber-specifically for the whole session (for example a call), but the channel is allocated to the subscriber for the time periods during which there is an actual need for the data transmission (for example speech or data transmission). In that case, channel allocation takes place before each data transmission transaction.

An interactive radio connection is illustrated in FIG. 2 by a circle in a UL frame representing an interactive message and by a triangle in a DL frame representing the corresponding message. The interactive data transmission is composed of successive circles and triangles, the circle being a response to the triangle, the triangle being a response to the circle etc. When the system is not heavily loaded,the interactive message transmission is successful by means of an appropriate selection of frame addresses, and the interactive message can be established in both transmission directions on the basis of the received messages. When the frame begins to fill up because of the increasing communication or a greater amount of time slots reserved for the subscriber, the situation becomes more complicated.

FIG. 3 illustrates a situation where the interactive message in the downlink direction (marked with a triangle) shown in FIG. 2 is composed on the basis of the messages submitted in the entire uplink frame. Such a situation exists for example in connection with an access grant (AG) message given in said DL frame. The base station informs about free addresses in a Y channel message in the downlink direction. A mobile station desiring to establish a connection in the uplink direction selects a channel which has been informed to be free and sends a random access (RA) message in the uplink direction on said channel informing in the message about its desire to establish a connection. The random access message is responded by the access grant (AG) message in the downlink direction informing the mobile station about the frame address or the frame addresses to be used on the radio channel to be established.

The frame will become full with the increase of communication, i.e. messages associated with the interactive connection are located within the entire frame matrix. Consequently, the downlink messages have no time to react with the uplink messages submitted in the previous message, and, on the other hand, they have no time to transmit the information to be utilized in the uplink frame. Using the channel resources in such a way is ineffective and radio spectrum is wasted in the establishment of the interactive connection.

The solution of the invention is described below in association with the channel allocation without, however, restricting it to this embodiment. FIG. 4 illustrates the solution of the invention. It is to be noted that only the parameters essential for the invention will be described herein. Thus, although for example timing advance is not dealt with in this connection, all the specifications relating to a normal transmission must be taken into account in the final solution.

FIG. 4 illustrates a first embodiment of the invention wherein a radio connection is based upon uplink and downlink superframes. Each superframe consists of 24 separate frame addresses being divided into two subframes f1 and f2 which both comprise 12 frame addresses. The transmission of the UL and DL superframes is timed in such a way that the transmission occurs simultaneously, i.e. the delay between different transmission directions is zero. The subframes uf1/df2 and uf2/df1 in the superframes usf and dfs are time-duplexed in such a way that the subframe transmissions occur at different times.

In the channel allocation, free channels for the subframe uf2 of the UL superframe UF1 are notified on the Y channel of the subframe df1 in the DL superframe DF1 and, correspondingly, free channels for the next subframe uf1 of the UL superframe UF2 are notified on the Y channel of the subframe df2 in the DL superframe DF1.

*Referring also to FIG. 8, an example of the radio system 100 is shown having a base station 102 and a mobile station 104. The base station 102 and mobile station 104 have subsystems 106, 108 to perform various features.* It is assumed that [a] *the* mobile station *102 of the radio system 100* listens to the Y channel in the subframe df1 of the DL superframe DF1. The mobile station selects a free channel submitted on the Y channel, such as CH1, and sends a random access (RA) message on the free channel CH1 being selected in the subframe uf2 of the UL superframe UF1. [A] *The* base station *104* responds by an access grant (AG) message in the subframe df1 of the DL superframe DF2. The AG message informs the mobile station that the channel CH1 has been reserved for it from the next subframe. The mobile station starts transmitting on the channel CH1 in the subframe uf2 of the UL superframe UF2. Since CH1 is now allocated to said mobile station, it is no longer announced through the Y channel in the subframe df1 of the DL superframe DF2. In the above description, the channel allocation takes place by means of the subframe pair df1 and uf2. A similar separate channel allocation can occur simultaneously (but in reverse phase) by means of another subframe pair df2 and uf1. It is possible that the same mobile station participates in the channel allocation in both subframe pairs.

Interactive acknowledgement messages (Y, AG) occur in each sub-frame of a superframe, preferably in the middle of the subframe, whereby the system has enough time to react with the messages. Traffic channels (such as CH1) occur only once in one superframe, i.e. in the present example only in the subframe uf2. In the present example, two connection layers are formed in the frame structure for the interactive messages, one of which is composed of the subframe uf1 of the UL superframes and the subframe df2 of the DL superframes, and correspondingly, the other is composed of the subframe uf2 of the UL superframes and the subframe df1 of the DL superframes. FIG. 5 illustrates the connection layers which are formed in the frame structure. In FIG. 5, solid arrows illustrate interactive communication at a connection level df1-uf2, and dashed arrows illustrate communication at a connection level df2-uf1. It is possible that the same mobile station participates in communication at both connection levels.

By means of the solution of the invention, the allocation situation for each UL subframe is already known in the previous DL subframe and the interactive message concerning each frame address can be transmitted before the next transmission of the frame address in the superframe. For example in the example in FIG. 4, the AG message relating to the RA message submitted in the channel CH1 in the subframe of the superframe UF1 is already submitted in the subframe df1 of the superframe DF2, whereby communication on the channel CH1 can already start in the subframe uf2 of the superframe UF2, the subframe uf2 being the frame wherein the channel CH1 occurs next.

Time-duplexing the connection layer ensures that the information submitted on the Y channel always contains exact information about the free channels in the next subframe. In addition, one AG message in the downlink direction can be employed for responding to all the RA messages at the same connection layer and the AG message can be transmitted to the mobile station before the allocated frame address or allocated frame addresses occur next time in the superframe.

A corresponding example can be presented regarding the aforementioned data transmission acknowledgement. The example is illustrated in FIG. 6. A channel CH2 composed of two UL-frame frame addresses has been reserved for a subscriber for the data transmission. When the data transmission is completed in the subframe uf2 of the superframe UF1, the connection is maintained and the mobile station waits for an ARQ acknowledgement message from the base station. In the case of a successful data transmission, the base station gives the acknowledgement message in the subframe db1 of a DL superframe DF2 and at the same time informs in a Y message that the frame addresses allocated to the channel CH2 are free. In the case of an unsuccessful data transmission, the base station sends a message informing about a transmission failure in the subframe df1 of the superframe DF2, whereby the mobile station can continue transmission on the channel CH2. In both cases, interactive information can be transmitted before the actual traffic channels occur next time in the superframe.

Interactive acknowledgement messages are preferably placed in the middle of the frame, whereby the system is given enough time to react with the information submitted in the previous subframe. If more time is needed in the processing of the messages in the UL and DL directions, as is the case in the systems based on CDMA multiple access technique where the duration of the message comprises the entire frame cycle, the superframe can be composed of more than one subframe. FIG. 7 illustrates the solution of the invention in the case of three subframes (connection layers). The first connection layer is composed of subframes uf2 and df3, the second connection layer is composed of subframes uf3 and df1 and the third connection layer is composed of subframes uf1 and df2. Reaction time has been increased in the case presented in FIG. 7 by delaying the uplink transmission with respect to the downlink transmission by half a frame cycle.

The principles of the invention can also be applied in the conventional time division duplex TDD where the signals in different directions are transmitted interleaved in time on the same transmission channel. In accordance with the invention, the frame in both directions can be composed of two or more subframes, the subframes in turn forming one or more connection layers.

The drawings and the related description are only intended to illustrate the inventive idea. The details of the solution and the frame structure of the invention may vary within the scope of the claims. Although the invention has been described in association with the system based on TDMA multiple access technique by using messages relating to channel allocation as an example, the described solution presented in the invention can also be employed in association with other radio systems using interactive messages.

What is claimed is:

[1. A method for implementing a duplex telecommunication connection in a radio connections based on interactive communication using data frames in a first transmission direction and in a reverse second transmission direction, each data frame comprising a plurality of frame addresses, and transmission capacity of each radio connection being variable by allocation of frame addresses to it, the method comprising:

composing information of interactive communication in the first transmission direction based on information transmitted in at least two frame addresses of one previous frame in the second transmission direction, forming the data frames in the first transmission direction and in the second transmission direction from at least two adjacent subframes, each subframe comprising at least two frame addresses, allocating the subframes in the first and second transmission direction to each interactive communication in such a way that the subframe in the first transmission direction and a subframe in the second transmission direction with allocations to the same interactive communication do not overlap in time, but said subframes may overlap in time with subframes with allocations to another interactive communication.]

[2. The method of claim 1, wherein the interactive transmission includes an uplink transmission of a random access burst and a downlink transmission of an access grant message as a response.]

[3. The method of claim 1, wherein the interactive transmission includes data transmission in one direction and a data transmission acknowledgement in another transmission direction.]

[4. The method of claim 1, wherein communication occurs at several connection layers whose number corresponds to number of subframes.]

[5. A radio system providing a duplex telecommunication connection in a radio connection based on interactive communication using data frames in a first transmission direction and in a reverse second transmission direction, each data frame comprising a plurality of frame addresses, and properties of each radio connection being variable by allocation of frame addresses to it, wherein the system is arranged to compose information of interactive communication in the first transmission direction based on information transmitted in at least one previous frame in the second transmission direction, form the data frames in the first transmission direction and in the second transmission direction from at least two time-adjacent subframes, each subframe comprising at least two frame addresses, allocate the subframes in said first and second transmission direction to each interactive communication in such a way that the subframe in the first transmission direction and a subframe in the second transmission direction allocated with allocations to the same interactive communication do not overlap in time, but said subframes may overlap in time with subframes with allocations to another interactive communication.]

[6. The radio system of claim 5 wherein the interactive transmission includes uplink transmission of a random access burst and downlink transmission of an access grant message as a response.]

[7. The radio system of claim 5 wherein the interactive transmission comprises data transmission in one direction and a data transmission acknowledgement in another transmission direction.]

[8. The radio system of claim 5 wherein communication occurs at several connection layers whose number corresponds to a number of sub-bands.]

[9. The method of claim 1 wherein the interactive transmission includes an uplink transmission of a random access burst and a downlink transmission of an access grant message as a response.]

[10. The method of claim 1 wherein the interactive transmission includes data transmission in one direction and a data transmission acknowledgement in another transmission direction.]

[11. The method of claim 1 wherein communication occurs at several connection layers whose number corresponds to a number of subframes.]

[12. The method of claim 1 wherein the duration of a message of said interactive communication corresponds with the cycle of the data frame it is allocated to.]

[13. The method of claim 1 wherein the data transmission capacity of said radio communication varies corresponding to the number of frame addresses allocated to it.]

*14. A method for communication comprising:*

*transmitting a request message in a first frame of a series of frames;*

*receiving an acknowledgement of the request message;*

*transmitting data in accordance with the acknowledgement in a second frame of the series of frames,*

*the first and second frames being next to one another in the series,*

*the first frame comprising a plurality of frame addresses, the frame addresses being divided among the plurality of the subframes, wherein the request message uses one or more frame addresses of a subframe of the plurality of subframes;*

*the second frame comprising the plurality of frame addresses repeated from the first frame, the frame addresses being divided among the plurality of subframes, wherein the data uses one or more frame addresses of a subframe of the plurality of subframes;*

*wherein the receiving step is performed, prior to the one or more frame addresses used by the request message being repeated in the second frame.*

*15. The method of claim 14 wherein the acknowledgment is in the middle of a third frame that is not part of the series of frames.*

*16. The method of claim 14, wherein the first and second frames are uplink frames.*

*17. The method of claim 16, wherein the is received in a third frame that is a downlink frame.*

*18. The method of claim 17 wherein the first and second frames are transmitted by a mobile unit and the third frame is received from a base station.*

*19. The method of claim 14, wherein the acknowledgement indicates that one or more frame addresses in an uplink direction are available.*

*20. A method for communication comprising:*

*receiving, in a downlink direction, a message in a first downlink frame comprising a plurality of frame addresses, the plurality of frame addresses being divided into a first subframe and a second subframe the first subframe including the message, the message identifying which uplink frame address or addresses are free;*

*transmitting, in an uplink direction, a request message in a first uplink frame comprising a plurality of frame addresses, the plurality of frame addresses being divided into a first subframe and a second subframe, the second subframe including the request message, the request message requesting one or more of the identified uplink frame address or addresses, the request message occupying one or more frame addresses of the second subframe;*

*receiving, in the downlink direction, an allocation message in a second downlink frame comprising a plurality of frame addresses, the plurality of frame addresses being divided into a first subframe and a second subframe, the first subframe including the allocation message, the allocation message allocating the requested uplink frame address or addresses, the first subframe being received prior to the recurrence of the one or more frame addresses occupied by the request message; and*

*transmitting, in the uplink direction, data in a second uplink frame comprising a plurality of frame addresses, the plurality of frame addresses being divided into a first subframe and a second subframe, the second subframe including the data within the allocated frame address or addresses,*

*wherein the first and second downlink frames are next to one another in a series of downlink frames and the first and second uplink frames are next to one another in a series of downlink frames.*

*21. The method of claim 20, wherein the message identifying which uplink frame address or addresses are free is a Yell message.*

*22. The method of claim 20, wherein the request message is a RACH message.*

*23. The method of claim 20, wherein the allocation message is an access grant message.*

*24. The method of claim 20, wherein the allocated frame address or addresses constitute a data channel.*

*25. A method for communication comprising:*

*transmitting, in an uplink direction, data in a first uplink frame comprising a plurality of frame addresses, the plurality of frame addresses being divided into a first subframe and a second subframe, the second subframe including the data on an allocated channel, the allocated channel occupying one or more frame addresses of the second subframe;*

*receiving, in a downlink direction, a message in a downlink frame comprising a plurality of frame addresses, the plurality of frame addresses being divided into a first*

*subframe and a second subframe, the first subframe including a message indicating that the data has not been received, the first subframe being received prior to the recurrence of the one or more frame addresses used by the allocated channel; and*

*transmitting, in the uplink direction, data in a second uplink frame comprising a plurality of frame addresses, the plurality of frame addresses being divided into a first subframe and a second subframe, the second subframe including a repetition of the data on the allocated channel.*

*26. A method for communication comprising:*

*transmitting, in an uplink direction, data in a first uplink frame comprising a plurality of frame addresses, the plurality of frame addresses being divided into a first subframe and a second subframe, the second subframe including the data on an allocated channel, the allocated channel occupying one or more frame addresses of the second subframe;*

*receiving, in a downlink direction, a message in a downlink frame comprising a plurality of frame addresses, the plurality of frame addresses being divided into a first subframe and a second subframe, the first subframe including a message acknowledging the data, the first subframe being received prior to the recurrence of the one or more frame addresses used by the allocated channel; and*

*releasing the allocated channel for use in a second uplink frame immediately following the first uplink frame, the frame addresses of the allocated channel being available for use prior to their recurrence in the second uplink frame.*

* * * * *